June 7, 1955   G. B. HUTTENLOCK ET AL   2,709,919
LAUNDRY MACHINE PROCESS RECORDER
Filed Oct. 26, 1950   3 Sheets-Sheet 1
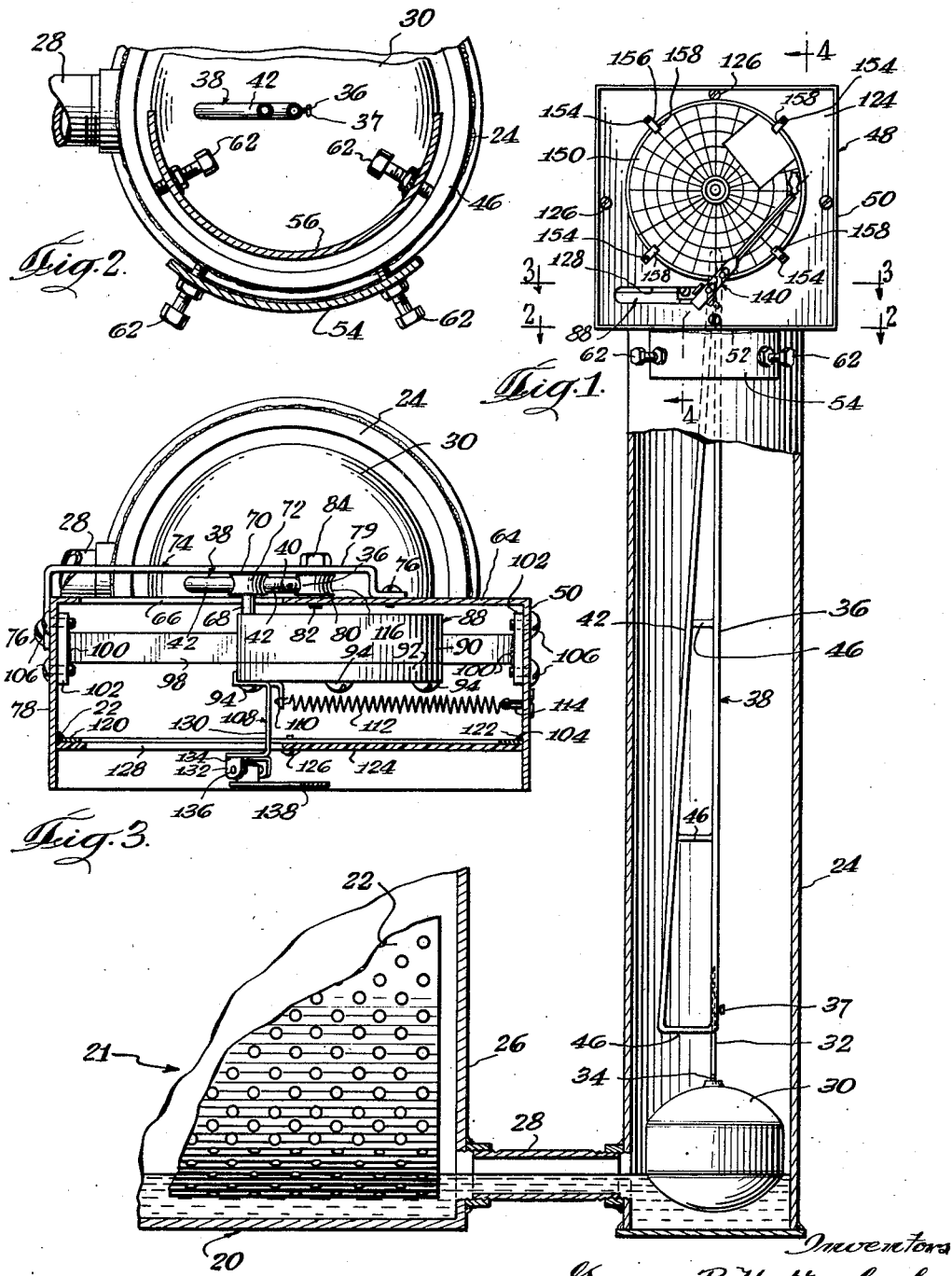
Inventors
George B. Huttenlock
William A. Cammow
By Louis Sheldon
Attorney

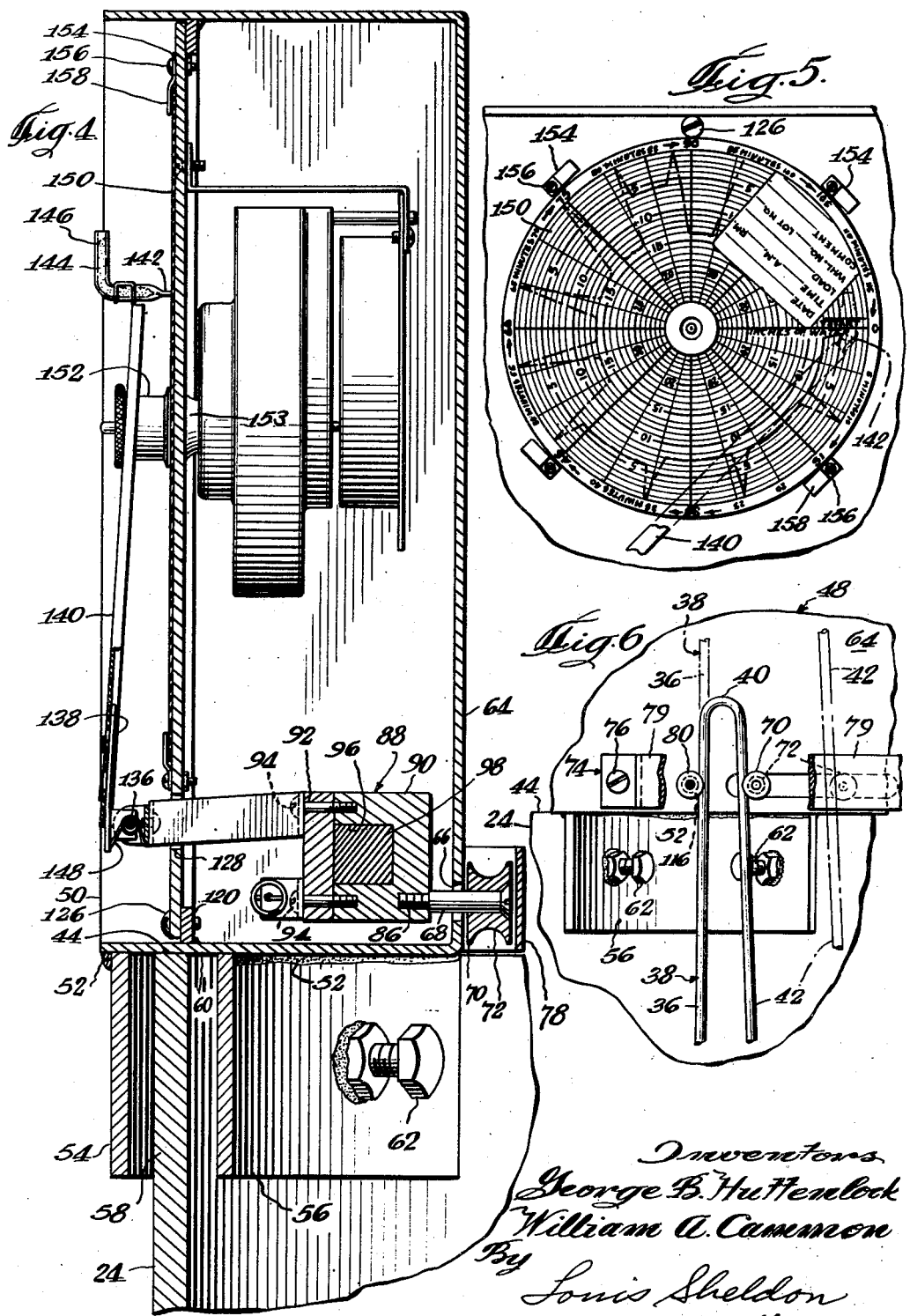

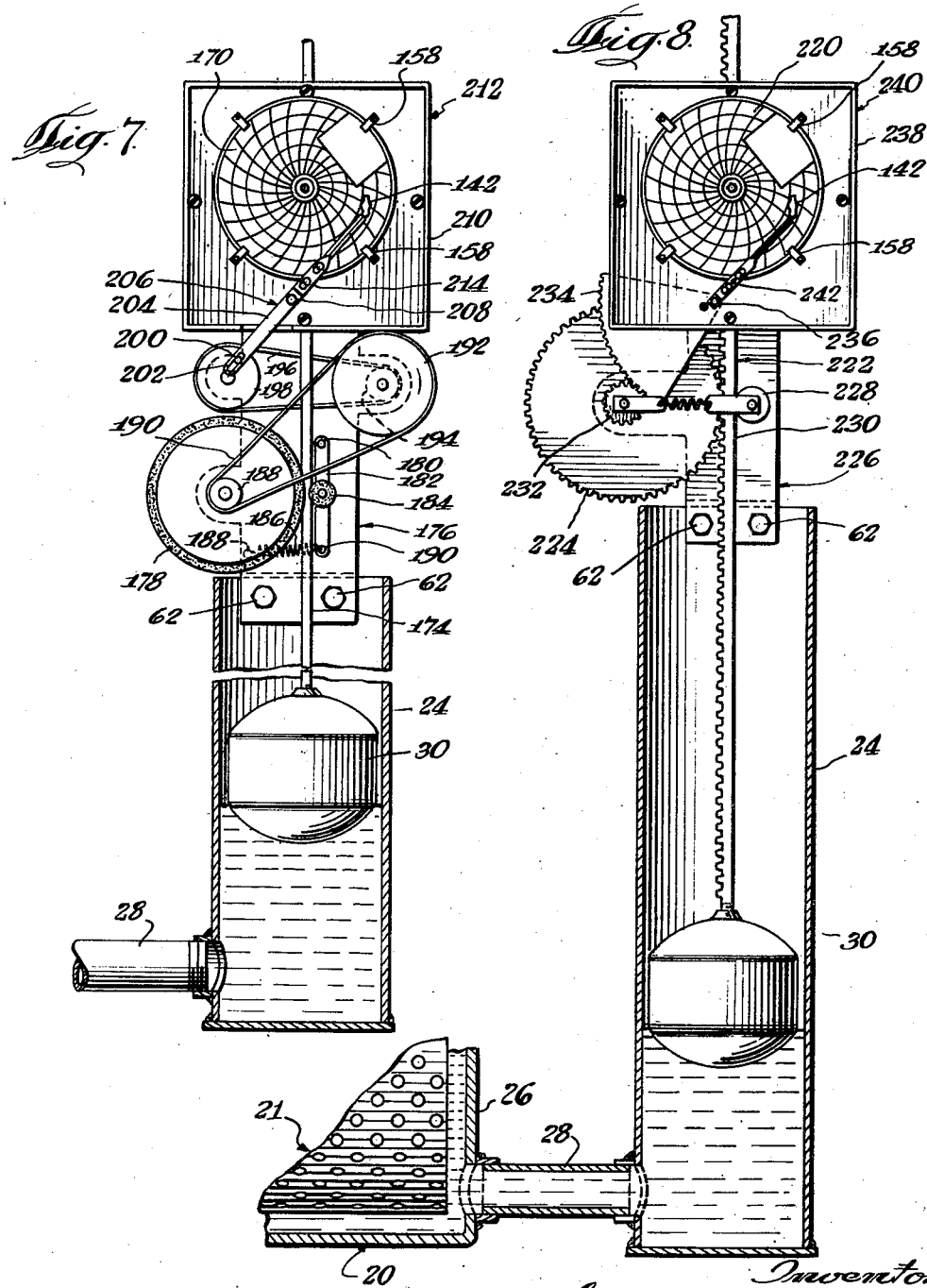

United States Patent Office 2,709,919
Patented June 7, 1955

2,709,919
LAUNDRY MACHINE PROCESS RECORDER

George B. Huttenlock, Peoria, and William A. Cammon, Chicago, Ill.

Application October 26, 1950, Serial No. 192,268

3 Claims. (Cl. 73—306)

This invention relates to laundry machines and is concerned more particularly with an apparatus operating independently of the machine and valves thereof for recording a cycle of the steps in a fabrics-cleansing process whereby a chart is produced showing the depth of liquid in each step and the duration of running of the machine in each step.

When a load of clothing or other material is treated in a laundry wash machine, for example, the load is subjected to a series of operations employing water alone or water to which is added at different times suds, bleach, sour mix, bluing and/or other chemicals. Experience shows that for best results water should be introduced to a predetermined level in the wash wheel and the load treated with the water alone or with the water mixed with the desired chemical, as the case may be, for a predetermined duration which may vary for the different liquid charges. Devices for automatically controlling a laundry machine, including the charging of the machine with water to the desired levels, introduction of chemical, and dumping of the charges after predetermined periods, are very expensive in initial cost, installation, adjustment and maintenance. Accordingly most laundry machines are manually controlled in these respects, and it is with those that this invention is particularly concerned.

Using a manually controlled laundry machine, it is desirable that some means be provided whereby a check can be made of each cycle and the individual steps thereof, so that the operator can be corrected where previous cycles or runs have been found faulty. Among the objects of the invention therefore are: the accurate and automatic recording of the various liquid levels involved in each change in the laundering formula, i. e., in the sequence and nature of the several liquid charges in the several steps of each cycle, and the charting of the entire laundering operation for each load of fabrics; the accurate and automatic recording in detail of the time consumed in each step of the entire process or cycle and the time consumed in charging the machine with each liquid and in dumping the liquid; and to provide a permanent chart record of all such details of each load undergoing a laundering cycle so that the chart may be used as a guide to improved production, determination of the causes of improper treatment of the material and improper water, settlement of complaints and disputes, monitoring the operator to preclude inefficient subsequent operation, and in general as a guide in the supervision of the machine and operator and to aid in reducing cost of labor and materials.

Further objects and advantages of the invention will appear as the description proceeds.

The invention will be better understood upon reference to the following description and accompanying drawings, in which:

Fig. 1 is a fragmentary view, partly in section and partly in elevation, showing a portion of a laundry machine and one form of the invention in conjunction therewith.

Fig. 2 is an enlarged fragmentary sectional view taken substantially as indicated by the line 2—2 in Fig. 1.

Fig. 3 is an enlarged sectional view taken as indicated by the line 3—3 in Fig. 1.

Fig. 4 is an enlarged sectional view taken as indicated by the line 4—4 in Fig. 1.

Fig. 5 is an enlarged fragmentary elevational view of the chart and mounting therefor appearing in Fig. 1.

Fig. 6 is an enlarged fragmentary elevational view of the upper end of the triangular element shown in Fig. 1, and associated mechanism, but taken from the opposite side, and showing the triangular element in full lines in one position and in dash-dot lines in another position.

Figs. 7 and 8 are similar to Fig. 1 but show modifications.

Referring now more particularly to the form of invention shown in Figs. 1 to 6, there is illustrated the casing 20 of a laundry machine 21 having a suitable inlet (not shown) for the admission of water thereto, a suitable outlet (not shown) for enabling liquid to be dumped preparatory to admission of a new batch of water, and a rotary drum or wash wheel 22 in the casing and perforated as at 23 to admit the water from the casing to the fabrics to be treated. The wheel 22 has an opening (not shown) for the introduction and removal of a load of clothing or other fabrics to be washed or dry cleaned, and for the introduction of soap or other chemical to be mixed with the water. A float chamber or pot 24 is disposed adjacent an end 26 of the casing 20, and communication between them is established by a suitable sleeve or nipple 28, so that the liquid is at the same level in the wheel 22, pot and casing. A float 30 is disposed in the pot 24.

The construction thus far described may be found on existing laundry machine installations. The present invention is concerned more closely structurally with the float 30, but will function as well whether associated with a float in a pot with which the machine is already provided (as noted above) or with an auxiliary pot (not shown) which may be connected to the casing with the main pot 24 by an arm of a T or Y fitting substituted for the nipple or sleeve 28.

A rod 32 is threaded at 34 into the top center of the float 30 and extends vertically and is telescoped into a tube 36 and held in adjusted relation thereto as by a set screw 37. The tube 36 forms the vertical side of a cam body 38 converging sharply upward to a preferably rounded apex or corner 40 (Fig. 6). The apex 40 and inclined or cam side 42 may be continuations of the tube 36. The tube 36 is coaxial with the pot 24 and float 30, and the apex 40 projects somewhat above the top 44 of the pot when the float is at the bottom of the pot. One or more webs or struts 46 may be provided to hold the cam sides 36 and 42 rigidly in relation to each other.

Superimposed on the float pot 24 is a timer generally indicated at 48, having a housing 50 to the bottom of which may be welded as at 52 arcuate radially spaced flanges 54 and 56 adapted to be positioned respectively outside of and within the upper portion 58 of the pot 24, and the bottom 60 of the housing preferably rests on the top 44 of the pot (Fig. 4), the flanges being provided with screws 62 whereby the timer may be detachably yet securely clamped to the top of the pot. One face 64 of the timer housing 50 may have a horizontal slot 66 through which extends an axle 68 journaling a roller 70 having a circumferential groove 72. A substantially U-shaped bracket 74 has its arms secured as at 76 to a side 78 and the face 64 of the timer housing 50, the bight 79 of said bracket being spaced from said face, and the roller 70 being disposed between said face and bight. A second roller 80 having a circumferential groove 81 is journaled on an axle 82 threaded into the housing face 64 and connected to the bracket bight 79. The axle 68 is threaded at 86 in a slide 88 which may be formed of a channel member 90 and a closure plate 92 is secured to the channel as at 94, and a bar 98 extending through the slide serves as a track along which said slide is reciprocable. The ends of the track 98 may be welded as at 100 to plates 102 secured as at 106 to the respective sides 78 and 104 of the timer housing 50.

The apex portion 40 of the cam 38, when the float 30 is in its lowermost position, preferably projects upward between the rollers 70 and 80. One of the screws 94 may also serve to mount a bracket 108 on the slide 88, said bracket having a tongue 110 to which an end of a spring 112 is anchored, the other end of the spring being anchored as by a cotter pin 114 to the side 104 of the housing 50, so that the slide, and with it the axle 68, is constantly biased toward the housing side 104 and thus the movable roller 70 is constantly urged toward the stationary roller 80. The cam sides 36 and 42 nest in the grooves of the rollers 70 and 80, and the spring 112 operates to hold the movable roller 70 in engagement with the inclined cam side 42 and to hold the vertical cam side 36 in engagement with the stationary roller 80. It is apparent, then, that as the float 30 rises in the float pot 24, the cam 38 also rises and the inclined cam side 42 cams the movable roller 70 in a direction away from the stationary roller 80 against the resistance of the spring 112, and as the float 30 descends in the pot, the spring 112 draws the movable roller toward the stationary roller, all for a purpose which will appear.

A supporting frame 120 may be welded as at 122 within the timer housing 50 parallel to the housing face 64, and a plate 124 secured as at 126 to said frame. The plate 124 has a horizontal slot 128 through which a second tongue 130 on the bracket 108 passes, and a second bracket 132, which may be welded as at 134 to said tongue, pivotally supports at 136 a bar 138 preferably detachably carrying as at 139 a writing arm 140 provided at its free end with a writing element or marker 142 having an ink well 144. A spring 148 about the pivot 136 biases the marker 142 lightly against a chart 150 detachably clamped as at 152 to a spindle 153 forming part of the timer mechanism (not shown) and rotated thereby at any desired rate, for example one revolution in two hours. Guides 154 swivel-mounted at 156 on the plate 124 are provided with fingers 158 confronting circumferentially spaced portions of the chart 150 to hold the chart flat without restricting its rotation, said fingers being swingable out of the way to permit mounting and removal of the chart.

The chart 150 is divided preferably into 24 equal angles, each indicating a duration of five minutes, and is also graduated radially to indicate the depth of liquid in the wash wheel 22. When the float 30 is at its lowermost position, it rests on a cushion of water, and the cam 38 is in the relation to the rollers 70 and 80 shown in Fig. 6 and the marker 142 is at a distance from the center of the chart 150 such as to indicate zero depth of liquid in the wash wheel 22. The timer 48 and wheel 22 may be started as the water commences to enter the casing, and, as the float rises, the cam acts upon the movable roller 70 to force the slide 88 in a direction to move the marker 142 radially toward the center of the chart, describing a slight curve on the chart (due to the rotation of the chart), said curve terminating when the water inlet is closed, the inner end of said line in cooperation with the depth graduations on the chart 150 indicating the depth of the liquid in the wheel, and, in cooperation with the time graduations on the chart, indicating the time consumed in supplying the liquid to the casing. As soon as the casing is filled to the desired level the liquid is shut off automatically at the pre-set desired level by the automatic inlet valve (not shown). If this step calls for a continuous treatment of the load by said liquid for say seven minutes, the marker 142, being stationary, will during that period draw an arcuate line at uniform radius on the rotating chart, showing the constant depth of the liquid in the wheel 22 during the seven minute period. At the end of the seven minute period, the operator dumps the liquid, with the result that the marker 142 moves radially outward relative to the chart 150 to its initial position, describing a slight curve on the chart due to the continued rotation of the chart. During each charging and dumping of the liquid, the timer may be stopped if desired, and in such event the lines drawn pursuant to movement of the marker 142 will of course be straight.

When the dumping is completed, new water is introduced into the casing 20 and at the same time the desired chemical is placed in the wheel 22 to commingle with the water, and when the water has reached the desired level in the wheel 22 and the inlet valve has closed, these steps are repeated, using such chemicals, if any, in each succeeding step as are required by a predetermined formula for the complete cycle, the marker 142 describing a graph on the chart 150 showing a continuous record of the various steps to the completion of the cycle.

After the cycle is completed the wheel 22 is stopped and the load removed therefrom and dried and ironed. The chart 150 thus produced may be used as a guide for the operator for succeeding cycles, or experiments may be made involving variations in the periods of one or more of the several steps as shown on the chart with a view to correction if the clothing or the like turns out to have been unsatisfactorily treated or, if satisfactory results are obtained, with a view to obtaining greater machine and operator efficiency.

Using the set screw 37, the cam 38 may be adjusted to locate the marker 142 at zero depth on the chart 150 when the water is at the same level as the bottom of the inside surface of the wash wheel 22. Thus the graph will accurately show the water level in the wash wheel 22.

In washing white work, for example, the washing formula may be as follows:

| Step | Chemical Added to Water | Water Level, inches | Minutes' Duration | Temperature, °F. |
|---|---|---|---|---|
| 1 | Break | 8 | 7 | 110 |
| 2 | Suds | 8 | 10 | 140 |
| 3 | do | 8 | 10 | 155 |
| 4 | Bleach Suds | 6 | 10 | 160 |
| 5 | None (rinse) | 14 | 5 | 160 |
| 6 | do | 14 | 5 | 160 |
| 7 | do | 14 | 5 | 160 |
| 8 | do | 14 | 5 | 120 |
| 9 | Sour | 6 | 5 | 100 |
| 10 | Blue | 14 | 5 | 70 |

The marker 142 for the foregoing cycle will draw a graph 160, substantially as shown in dot-dash lines in Fig. 5, depicting the duration of treatment of the load with each liquid charge and the level of each liquid charge in the wheel 22.

The wheel 22 rotates sufficiently slowly to give the operator time, without stopping the wheel, to insert the necessary chemical through the wheel door (not shown) for each step after the used liquid has been dumped.

The dumping time is usually about 1½ minutes, which is ample to dispose of the entire used charge before the next charge is introduced. The time consumed for supplying the machine to the desired level is usually a fraction of a minute, and new water is introduced usually as soon as the used liquid is discharged.

Another form of the invention is shown in Fig. 7. Here, the chart 170 is graduated in concentric circles to designate liquid depth, and in curved rays from the center to designate time. These rays are curved for the reason that in this form of the invention the marker 142 travels in an arcuate path, being actuated by a pulley mechanism instead of the cam mechanism above described. In Fig. 7, a vertical rod 174 is threaded to the top center of a float 30 in a float pot 24 and extends substantially above the top of the pot. A bracket 176 is clamped as above to the upper end of the pot 24 and carries a grooved friction roller 178. Pivoted at 180 to the bracket 176 is an arm 182 carry a grooved friction roller 184 biased lightly toward the roller 178 by a spring 186 anchored at one end to the bracket and at its other end to the arm. The rod 174 extends between and frictionally engages and is guided by the rollers 178 and 184, so that reciprocatory movements of the rod effect oscillatory movements of the rollers.

A pulley 188 rotates with the roller 178 and is operatively connected by a belt 190 with a second pulley 192 carried by the bracket 176. A third pulley 194 rotates with the pulley 192 and is operatively connected by a belt 196 with a fourth pulley 198 carried by the bracket 176. The pulley 198 has a crank pin 200 which rides in a slot 202 in one arm 204 of a lever 206 pivoted at 208 to the casing 210 of a timer 212, the other arm 214 of the lever carrying a marker 142.

When the float 30 rises, the mechanism actuated thereby causes the marker 142 to move in an arcuate path toward the center of the chart 170, mounted like the chart 150 on the timer casing 50, the line being of greater curvature, however, than the rays on the chart, if the chart rotates during the movement of the marker, and of the same curvature as the rays if the chart is stationary during the movement of the marker. The graph produced on the chart 170 will accordingly give the same information as that produced on the chart 150.

Adjustment for properly locating the marker to indicate the water level from which the float commences rising can be obtained by slipping the belt 196 off the pulley 198 and turning the latter to the desired extent before replacing the belt.

A further form of the invention is shown in Fig. 8, wherein the chart 220 (which may be identical with the chart 170) is formed with concentric circles and arcuate rays to indicate liquid depth and time, respectively, the marker 142 being moved in an arcuate path by gear mechanism, as will appear. In Fig. 8, a vertical rack 222 is secured to the top center of the float 30 in the pot 24 and meshes with a gear 224 carried by a bracket 226 clamped as at 62 to the top of the pot. A roller 228 carried by the bracket 226 is lightly biased against the edge 230 of the rack 222 to maintain the mesh and guide the rack in its vertical reciprocation. A pinion 232 rotating with the gear 224 meshes with a quadrant 234 pivoted at 236 to the housing 238 of a timer 240 and moving a lever 242 pivoted at 244, said lever carrying a marker 142. Thus reciprocation of the rack 222 is accompanied by arcuate movements of the marker 142.

In the various forms, described above, the charts are circular and rotate. Conceivably each graduated chart could be in the form of a ribbon or tape mounted on rollers and having rectilinear motion where it is engaged by the marker, with the liquid depth indicating graduations running parallel to the direction of tape motion and the time graduations running transverse to said direction.

Various modifications may suggest themselves to those skilled in the art without departing from the spirit of our invention. Hence we do not wish to be restricted to the specific forms shown or uses mentioned, except to the extent indicated in the appended claims, which are to be interpreted as broadly as the state of the art will permit.

We claim:

1. In a process recording device for a fabrics-cleansing machine adapted to be successively charged with various fabrics-treating liquids in a predetermined cycle, said device comprising a float pot having an inlet for receiving liquid from a laundry machine wheel casing, a float in said pot, a timer, a chart driven by said timer and bearing time indicia graduated in the direction of movement of said chart and also bearing liquid-depth indicia graduated transverse to said direction, and writing means engaged with said chart and movable in opposite directions transverse to said direction of chart movement; mechanism operatively connected to said writing means and float and actuatable to move said writing means to draw liquid-depth-indicating lines on said chart in response to float movements and time-indicating lines on said chart in response to movement of said chart to produce a continue-time-and-liquid-depth graph as the machine operates in a predetermined cleansing cycle, said mechanism comprising a track fixed relative to said timer and extending transverse to said direction of chart movement, a slide engaging said track, a grooved roller carried by said slide, a cam carried by and inclined upward relative to said float and engaged in the groove of said roller, and means biasing said roller against said cam, whereby movements of said float are accompanied by movements of said slide, and said cam is guided by said roller.

2. In a process recording device for a fabrics-cleansing machine adapted to be successfully charged with various fabrics-treating liquids in a predetermined cycle, said device comprising a float pot having an inlet for receiving liquid from a laundry machine wheel casing, a float in said pot, a timer, a chart driven by said timer and bearing time indicia graduated in the direction of movement of said chart and also bearing liquid-depth indicia graduated transverse to said direction, and writing means engaged with said chart and movable in opposite directions transverse to said direction of chart movement: mechanism operatively connected to said writing means and float and actuatable to move said writing means to draw liquid-depth-indicating lines on said chart in response to movement of said chart to produce a continuous time-and-liquid-depth graph as the machine operates in a predetermined cleansing cycle, said mechanism comprising a sharply acute-angled cam fixed to and converging upward from and movable with said float, one side of said cam extending parallel to the axis of said pot, a support carrying said writing means and also carrying a follower engaging the other side of said cam, means guiding said support in opposite movements transverse to said direction of chart movement, bearing means engaging the first mentioned side of said cam, and means biasing said follower toward said cam and bearing means, said follower and bearing means comprising grooved rollers and said sides of said cam being transversely rounded and projecting into the grooves of said rollers.

3. In a process recording device for a fabrics-cleansing machine adapted to be successively charged with various fabrics-treating liquids in a predetermined cycle, said device comprising a float pot having an inlet for receiving liquid from a fabrics-cleansing machine, a float in said pot, a rod connected to and extending upward from said float, a timer mounted on the top of said pot, a chart driven by said timer and bearing time indicia graduated in the direction of movement of said chart and also bearing liquid-depth indicia graduated transverse to said direction, writing means carried by said timer, and means confining said writing means to travel in opposite directions transverse to said direction of chart movement: a cam comprising a tube bent into V-shape defining a sharply acute angle, said rod being telescoped into one side of said cam, means for securing said rod and cam side in relatively adjusted positions, a roller carried on a fixed axis by said timer and engaging said cam side, a roller carried on a movable axis and traveling with said writing means, and means biasing the second-mentioned roller into engagement with the other side of said cam, said other cam side being inclined to the direction of movement of said float, the first-mentioned cam side being coaxial with said float, whereby said writing means travels in response to rise and fall of said float.

References Cited in the file of this patent

UNITED STATES PATENTS

| 36,411 | Krausch | Sept. 9, 1862 |
| 483,722 | Lewis | Oct. 4, 1892 |
| 756,642 | Jensen | Apr. 5, 1904 |
| 920,025 | Connet | Apr. 27, 1909 |
| 966,046 | Noonan | Aug. 2, 1910 |
| 996,546 | Watson | June 27, 1911 |
| 1,751,646 | Nieman | Mar. 25, 1930 |
| 1,922,362 | Halversen | Aug. 15, 1933 |
| 1,964,632 | Hays | June 26, 1934 |